(12) United States Patent
Oh

(10) Patent No.: US 11,269,538 B2
(45) Date of Patent: Mar. 8, 2022

(54) STORAGE SYSTEM, STORAGE DEVICE THEREFOR, AND OPERATING METHOD THEREOF

(71) Applicant: SK hynix Inc., Icheon (KR)

(72) Inventor: Tae Jin Oh, Icheon (KR)

(73) Assignee: SK hynix Inc., Icheon (KR)

( * ) Notice: Subject to any disclaimer, the term of this patent is extended or adjusted under 35 U.S.C. 154(b) by 36 days.

(21) Appl. No.: 16/911,101

(22) Filed: Jun. 24, 2020

(65) Prior Publication Data

US 2021/0181967 A1 Jun. 17, 2021

(30) Foreign Application Priority Data

Dec. 17, 2019 (KR) .......................... 10-2019-0168842

(51) Int. Cl.
*G06F 3/06* (2006.01)

(52) U.S. Cl.
CPC .......... *G06F 3/0647* (2013.01); *G06F 3/0604* (2013.01); *G06F 3/067* (2013.01)

(58) Field of Classification Search
None
See application file for complete search history.

(56) References Cited

U.S. PATENT DOCUMENTS

| 8,429,431 | B2 * | 4/2013 | Malik | G06F 1/3209 |
| | | | | 713/300 |
| 10,367,752 | B2 * | 7/2019 | Gupta | H04L 47/625 |
| 2020/0404069 | A1 * | 12/2020 | Li | H04L 67/289 |

FOREIGN PATENT DOCUMENTS

KR 20180111492 10/2018

* cited by examiner

*Primary Examiner* — Brian R Peugh

(57) ABSTRACT

A storage system includes at least one host and a plurality of storage devices coupled to the at least one host through a network. Each of the plurality of storage devices generates state information of the storage device by monitoring hardware and software states of the storage device, and wherein, among the plurality of storage devices, a source storage device selects at least one target storage device based on the state information of storage devices other than the source storage device, and transmits distribution target data of the source storage device to the at least one target storage device, the source storage device being a storage device which needs data distribution.

20 Claims, 12 Drawing Sheets

STORAGE SYSTEM, STORAGE DEVICE THEREFOR, AND OPERATING METHOD THEREOF

CROSS-REFERENCES TO RELATED APPLICATION

The present application claims priority under 35 U.S.C. § 119(a) to Korean Patent Application Number 10-2019-0168842, filed on Dec. 17, 2019, in the Korean Intellectual Property Office, which is incorporated herein by reference in its entirety.

BACKGROUND

1. Technical Field

Various embodiments may generally relate to a data processing system, and more particularly, to a storage system, a storage device therefor, and an operating method thereof.

2. Related Art

Nonvolatile memory express (NVMe) is a NVM-dedicated protocol which uses a physical interface of peripheral component interconnect express (PCIe).

NVMe-over fabric (NVMe-oF) is the technology which can connect hundreds or thousands of NVMe-compliant storage devices to each other through fabric networks such as Ethernet, a fiber channel, Infiniband, and the like.

As the demands for memory-centric computing devices for processing big data are increased, there is a need for more computing resources, high bandwidth networks, and high-performance, and high-capacity storage devices.

Various studies have been conducted to minimize the burden on a host, for example, to minimize data movement between a storage device and the host by offloading operation processing to the storage device from the host in the memory-centric computing devices.

SUMMARY

In an embodiment of the present disclosure, a storage system may include at least one host; and a plurality of storage devices coupled to the at least one host through a network, wherein each of the plurality of storage devices generates state information of the storage device by monitoring hardware and software states of the storage device, and wherein, among the plurality of storage devices, a source storage device selects at least one target storage device based on the state information of storage devices other than the source storage device, and transmits distribution target data of the source storage device to the at least one target storage device, the source storage device being a storage device which needs data distribution.

In an embodiment of the present disclosure, a storage device which is coupled to at least one host through a network, the storage device comprising: a controller; and a data storage device to store and read data according to control of the controller, wherein the controller includes: a network interface to couple the storage device to the network; a storage interface to provide a communication channel between the controller and the data storage device; and a processor to generate and store first state information of the storage device by monitoring hardware and software states of the storage device, set the storage device as a source storage device when data distribution is necessary according to a monitoring result, select at least one target storage device based on second state information of a plurality of storage devices connected to the network, and transmit distribution target data of the source storage device to the at least one target storage device, the plurality of storage device being different from the storage device.

In an embodiment of the present disclosure, an operating method of a storage system may include: generating and storing, by each of a plurality of storage device, state information by monitoring hardware and software states of each of the plurality of storage devices, the plurality of storage devices being coupled to at least one host through a network; selecting, by a source storage device, at least one target storage device based on the state information of storage devices other than the source storage device among the plurality of storage devices, the source storage device being a storage device which needs data distribution according to a monitoring result; and transmitting, by the source storage device, distribution target data to the at least one target storage device.

These and other features, aspects, and embodiments are described in more detail below.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Various embodiments of the present teachings are described in detail with reference to the accompanying drawings. The drawings are schematic illustrations of various embodiments. As such, variations from the configurations of the illustrations are to be expected. Thus, the described embodiments should not be construed as being limited to the particular configurations illustrated herein but may include deviations in configurations which do not depart from the spirit and scope of the present teachings as defined in the appended claims.

Although a few embodiments of the present teachings are shown and described, it will be appreciated by those of ordinary skill in the art that changes may be made in these embodiments without departing from the principles and spirit of the present teachings.

Figure 1:
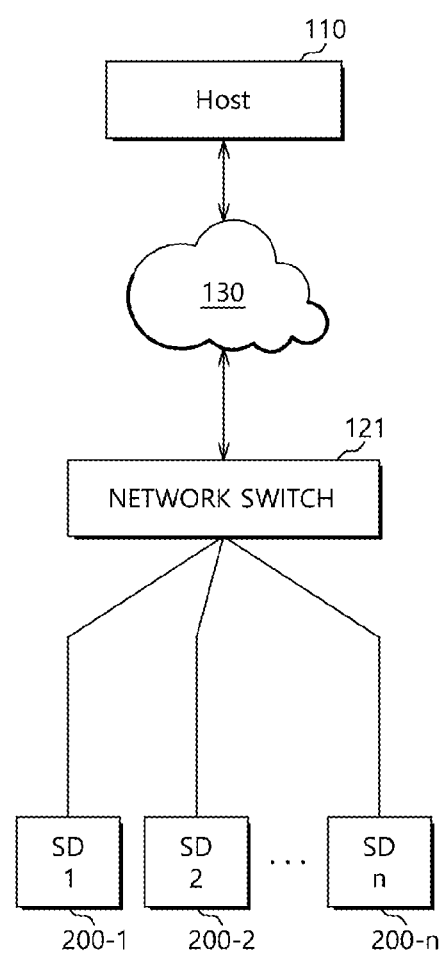
FIG. 1 is a diagram illustrating a configuration of a storage system according to an embodiment of the present disclosure.

FIG. 1 is a diagram illustrating a configuration of a storage system 1 according to an embodiment.

The storage system 1 may include at least one host 110 and a plurality of storage devices (SD1 to SDn) 200-1 to 200-n coupled to the at least one host 110 through a network 130.

The network 130 may be a fabric network such as Ethernet, a fiber channel, InfiniBand, or the like.

The storage devices 200-1 to 200-n may be solid state drives (SSDs), for example, Ethernet-SSDs (eSSDs).

The at least one host 110 may set an NVMe-oF connection with the storage devices 200-1 to 200-n.

A network switch 121 may provide an environment that the plurality of storage devices 200-1 to 200-n can be coupled to the at least one host 110 through the network 130. The network switch 121 may store addresses for identifying the storage devices 200-1 to 200-n in its internal memory (not shown) and allow each of the at least one hosts 110 to perform data exchange with a specific storage device among the storage devices 200-1 to 200-n.

The network switch 121 may communicate with the host 110 through an uplink port at a first speed and communicate with the plurality of storage devices 200-1 to 200-n through a downlink port at a second speed.

The plurality of storage devices 200-1 to 200-n may provide high-performance and high-capacity data storage solutions. The NVMe-oF protocol may allow an application, which is driven in the host 110, to be offloaded to and processed in the plurality of storage devices 200-1 to 200-n in a remote direct-attached storage (rDAS) manner.

Figure 2A:
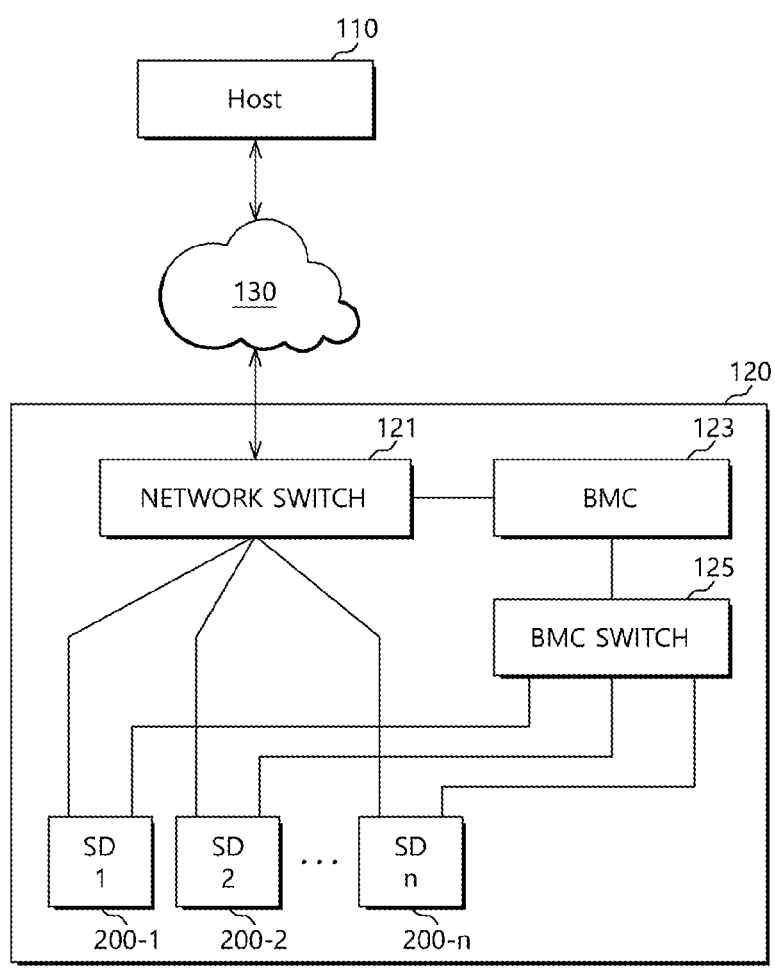
FIGS. 2A and 2B are diagrams illustrating configurations of storage systems according to embodiments of the present disclosure.
Figure 2B:
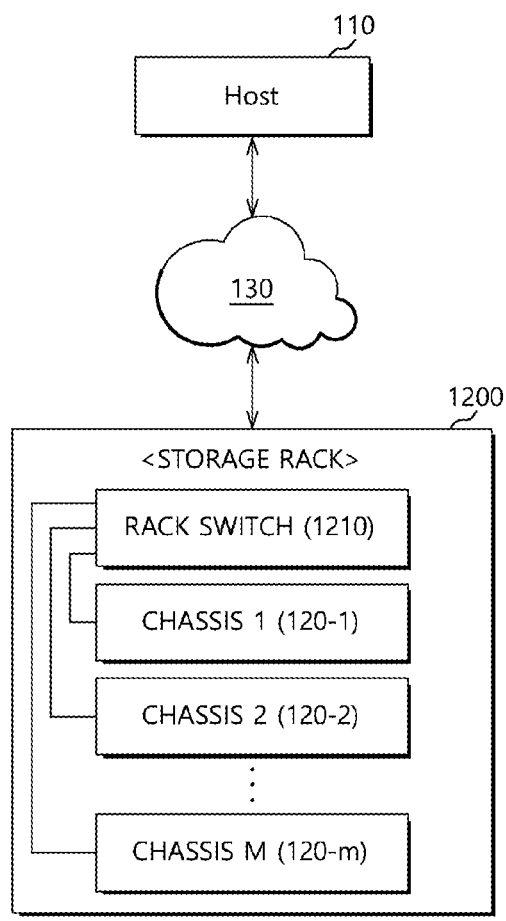

FIGS. 2A and 2B illustrates configurations of storage systems according to embodiments.

Referring to FIG. 2A, a storage system 10 may include at least one host 110 and a storage chassis 120 connected to the at least one host 110 through a network 130.

The network 130 may be a fabric network such as Ethernet, a fiber channel, InfiniBand, or the like.

The storage chassis 120 may include a plurality of storage devices (SD1 to SDn) 200-1 to 200-n. In an embodiment, the storage devices 200-1 to 200-n may be solid state drives (SSDs), for example, Ethernet-SSDs (eSSDs).

The at least one host 110 may set an NVMe-oF connection with the storage devices 200-1 to 200-n in the storage chassis 120.

The storage chassis 120 may further include a network switch 121, a baseboard management controller (BMC) 123, and a BMC switch 125. The plurality of storage devices 200-1 to 200-n may be coupled to or mounted on a motherboard or a baseboard.

The network switch 121 may provide an environment that the plurality of storage devices 200-1 to 200-n can be coupled to the at least one host 110 through the network 130. The network switch 121 may store addresses for identifying the storage devices 200-1 to 200-n in its internal memory (not shown) and allow each of the at least one hosts 110 to perform data exchange with a specific storage device among the storage devices 200-1 to 200-n.

The network switch 121 may communicate with the host 110 through an uplink port at a first speed and communicate with the plurality of storage devices 200-1 to 200-n through a downlink port at a second speed.

The BMC 123 may be coupled to the network switch 121 and configured to manage inner elements in the storage chassis 120. In particular, the BMC 123 manages the plurality of storage devices 200-1 to 200-n and the network switch 121. In an embodiment, the BMC 123 may set boot and control paths by setting the plurality of storage devices 200-1 to 200-n and the network switch 121 according to a command provided by a system administrator. The BMC 123 may check hardware health information, such as a connection state, lifespan, temperature, and log information of the plurality of storage devices 200-1 to 200-n, and power consumption information.

The BMC switch 125 may provide an environment that the plurality of storage devices 200-1 to 200-n and the BMC 123 can be connected to each other. In an embodiment, the BMC switch 125 may include a peripheral component interconnect express (PCIe) switch.

The plurality of storage devices 200-1 to 200-n, the network switch 121, the BMC 123, and the BMC switch 125 may be installed together in a chassis or an enclosure to constitute the storage chassis 120.

The plurality of storage devices 200-1 to 200-n may provide high-performance and high-capacity data storage solutions. The NVMe-oF protocol may allow an application, which is driven in the host 110, to be offloaded to and processed in the plurality of storage devices 200-1 to 200-n in a remote direct-attached storage (rDAS) manner.

Referring to FIG. 2B, a storage system 100 according to an embodiment may include at least one host 110 and a storage rack 1200 connected to the at least one host 110 through a network 130.

The storage rack 1200 may include a rack switch 1210 and a plurality of storage chassis 120-1 to 120-m.

The rack switch 1210 may be configured to provide a connection between the plurality of storage chassis 120-1 to 120m.

Each of the storage chassis 120-1 to 120m may have a configuration that a plurality of storage devices such as eSSDs are coupled to or mounted on a motherboard with a network switch and a BMC.

In an embodiment, each of the plurality of storage chassis 120-1 to 120m may be configured of the storage chassis 120 illustrated in FIG. 2A.

The storage devices 200-1 to 200-n constituting the storage systems 1, 10, and 100 of FIGS. 1, 2A, and 2B may be configured to distribute data between the plurality of storage devices 200-1 to 200-n independently from the host 110 without intervention of the host 110 in another aspect.

Referring to FIG. 2A, among the plurality of storage devices 200-1 to 200-n, a storage device which needs the data distribution may be referred to as a 'source storage device,' and a storage device which receives and stores distribution target data from the source storage device may be referred to as a 'target storage device.' The distribution target data represents data that needs to be transmitted from the source storage device to the target storage device.

Any of the plurality of storage devices 200-1 to 200-n may be the source storage device, and the source storage device may select at least one target storage device based on state information of the remaining storage devices other than the source storage device, and may distribute the distribution target data to the selected target storage device.

In an embodiment, the source storage device may transmit the distribution target data, which is data selected according to a set criterion, to the target storage device, and the target storage device may store the distribution target data transmitted from the source storage device. Therefore, the distribution target data of the source storage device may be distributed to and stored in the target storage device. In an embodiment, the source storage device may divide the distribution target data into a plurality of pieces of distribution target data and distribute the plurality of pieces of distribution target data to a plurality of target storage devices.

In an embodiment, the state information may be information collected by the storage devices 200-1 to 200-n by monitoring states, for example, hardware and software states, of the storage devices 200-1 to 200-n. The hardware state may include one or more of remaining storage capacity, the number of bad blocks, temperature, lifespan, and the like. The software state may include one or more of a busy degree, the number of requests provided by the host 110, a request pattern frequently requested by the host 110, a data pattern requested by the host 110, and the like.

The state information may be shared between the storage devices 200-1 to 200-n through the use of various methods, and the source storage device which needs data distribution may select at least one target storage device based on the state information and distribute data to the selected target storage device.

In an embodiment, the state information may be shared according to a request and response method. In the request and response method, the source storage device may request the other storage devices to transmit the state information of the other storage devices thereto. Alternatively, in the request and response method, the source storage device may transmit a condition required for data distribution, for example, a detailed condition for the state information to the other storage devices, and according to responses provided by storage devices, which satisfy the detailed condition among the other storage devices, the source storage device may select at least one target storage device among the storage devices which satisfy the detailed condition, and may distribute distribution target data to the at least one target storage device.

In an embodiment, the state information may be shared according to a broadcasting and inquiry method. In the broadcasting and inquiry method, when the storage devices 200-1 to 200-n are employed in the storage system 10 or 100, each of the storage devices 200-1 to 200-n may transmit (broadcast) its state information to the other storage devices among the storage devices 200-1 to 200-n. Each of the storage devices 200-1 to 200-n which receives the state information of the other storage devices may store the received state information therein. A source storage device, which needs data distribution among the storage devices 200-1 to 200-n, may select at least one target storage device based on the state information of the other storage devices that is stored therein.

Alternatively, in the broadcasting and inquiry method, when the storage devices 200-1 to 200-n are employed in the storage system 10 or 100, the storage devices 200-1 to 200-n may transmit (broadcast) state information to the BMC 123, and the BMC 123 may store the state information of the storage devices 200-1 to 200-n therein. A source storage device which needs the data distribution may select at least one target storage device based on the state information stored in the BMC 123.

When the state information is shared according to the broadcasting and inquiry method, each of the storage devices 200-1 to 200-n may transmit changed state information thereof to the other storage devices or the BMC 123, so that the state information stored in the other storage devices or the BMC 123 is updated when a variation of the state information of the storage device being monitored is equal to or more than a set threshold value. Thus the state information of the storage devices 200-1 to 200-n may reflect the latest states of the storage devices 200-1 to 200-n.

In an embodiment, referring to FIGS. 2A and 2B, the BMC 123 of each of the plurality of storage chassis 120-1 to 120m may periodically collect state information of the storage devices 200-1 to 200-n included in each of the plurality of storage chassis 120-1 to 120m and broadcast the collected state information to the other storage chassis, so that the BMC 123 of each of the plurality of storage chassis 120-1 to 120m may include up-to-date state information of all storage devices in the storage system 10 or 100. Therefore, each storage device in the storage system 10 or 100 may distribute data to any of storage devices in the plurality of storage chassis 120-1 to 120m based on the state information stored in the BMC 123 of a corresponding storage chassis in which the storage device is included.

Figure 3:
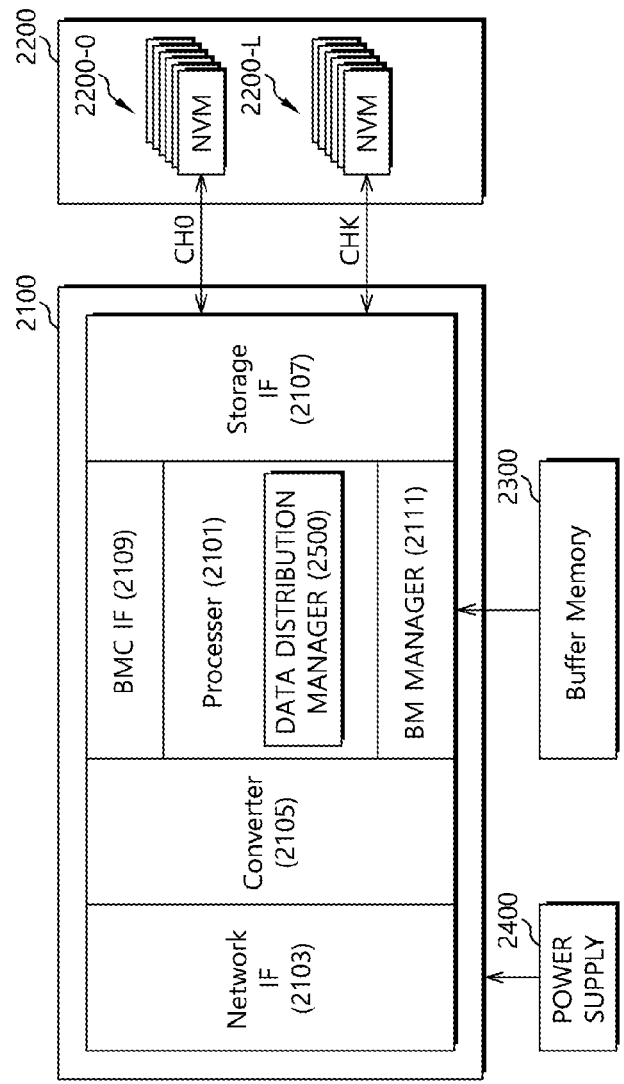
FIG. 3 is a diagram illustrating a configuration of a storage device according to an embodiment of the present disclosure.

FIG. 3 is a diagram illustrating a configuration of a storage device 200 according to an embodiment. The storage device 200 may correspond to any one of the plurality of storage devices 200-1 to 200-n illustrated in FIGS. 1, 2A, and 2B, for example, the storage device 200-1.

Referring to FIG. 3, the storage device 200 may include a controller 2100, a data storage device 2200, a buffer memory 2230, and a power supply 2240. The data storage device 2200 may include a plurality of nonvolatile memory devices (NVMs) 2200-0 to 2200-L, L being a positive integer.

The controller 2100 may analyze and process a signal input from the host 110. The controller 2100 may operate according to firmware or software for driving the data storage device 2200.

In an embodiment, the controller 2100 may perform a function of a flash translation layer (FTL) which performs garbage collection, address mapping, ware leveling, and the like for managing the data storage device 2200, a function which detects and corrects an error of data read out from the data storage device 2200, and the like.

The buffer memory 2300 may temporarily store data to be stored in the data storage device 2200. The buffer memory 2300 may also temporarily store data read out from the data storage device 2200. The data temporarily stored in the buffer memory 2300 may be transmitted to the host 110, the data storage device 2200, or another storage device according to control of the controller 2100.

The nonvolatile memory devices 2200-0 to 2200-L may be used as storage media of the storage device 200. The nonvolatile memory devices 2200-0 to 2200-L may be coupled to the controller 2100 through a plurality of channels CH0 to CHk. One or more nonvolatile memory devices may be coupled to one channel. The nonvolatile memory devices coupled to the same channel may be coupled to the same signal bus, or the same data bus, or both.

The power supply 2400 may provide power input through a power connector to the controller 2100, the nonvolatile memory device 2200-0 to 2200-L, and the buffer memory 2300. The power supply 2400 may further include a subsidiary power supply configured to supply power to the storage device 200 so that the storage device 200 is normally terminated when sudden power off (SPO) occurs.

In an embodiment, the controller 2100 may include a processor 2101, a network interface (IF) 2103, a converter 2105, a storage interface (IF) 2107, a BMC interface (IF) 2109, and a buffer memory (BM) manager 2111. The BMC interface 2109 may be omitted according to implementation types of the storage systems 1, 10, and 100.

The processor 2101 may be configured in a combined form of software and hardware and drive the software or firmware loaded to operate the storage device 200.

The network interface 2103 may provide a communication channel between the storage device 200 and the network 130 through the network switch 121 to communicate with the host 110.

The converter 2105 may be configured to perform conversion between a communication protocol of the network interface 2103 which connects the storage device 200 to the network 130 and a communication protocol of the inside of the storage device 200.

The storage interface 2107 may provide a communication channel for signal exchange between the controller 2100 and the data storage device 2200. The storage interface 2107 may write data temporarily stored in the buffer memory 2300 into the data storage device 2200 according to control of the processor 2101. The storage interface 2107 may transmit data read out from the data storage device 2200 to the buffer memory 2300 so that the read data is temporarily stored in the buffer memory 2300.

The BMC interface 2109 may provide a communication channel between the storage device 200 and the BMC 123 through the BMC switch 125. In an embodiment, the BMC interface 2109 may be a PCIe interface.

The BM manager 2111 may be configured to manage a usage state of the buffer memory 2300. In an embodiment, the BM manager 2111 may divide the buffer memory 2300 into a plurality of regions (slots) and allocate or release the regions in order to temporarily store data.

The processor 2101 may include a data distribution manager 2500.

In an embodiment, the data distribution manager 2500 may be configured to collect state information of the storage device 200 that is set to be shared between the storage devices 200-1 to 200-n of the storage systems 1, 10 and 100, and transmit the collected state information to the other storage devices of the storage systems 1, 10 and 100 or to the BMC 123. The data distribution manager 2500 may receive and store state information from the other storage devices or may access the BMC 123 to inquire the state information from the other storage devices. For example, when the storage device 200 corresponds to the storage device 200-1 of the storage systems 1, 10 and 100, the data distribution manager 2500 of the storage device 200-1 may collect the state information of the storage device 200-1 and transmit the state information of the storage device 200-1 to the other storage devices 200-2 to 200-n, or receive and store state information of the other storage devices 200-2 to 200-n.

When data of the storage device 200 (for example, the storage device 200-1) is necessary to be distributed, the data distribution manager 2500 may be configured to select a target storage device among the other storage devices (for example, the storage devices 200-2 to 200-n) based on the state information of the other storage devices and distribute the data of the storage device 200 to the selected target storage device.

In an embodiment, for example, the data distribution manager 2500 may request the other storage devices to send the state information of the other storage devices and select the target storage device based on the state information received from the other storage devices. In another example, the data distribution manager 2500 may refer to the state information received and stored therein as the other storage devices broadcast the state information in order to select the target storage device among the other storage devices. In still another example, the data distribution manager 2500 may refer to the state information collected in the BMC 123 to select the target storage device.

In another embodiment, the data distribution manager 2500 may transmit a detailed condition for the state information to the other storage devices and select the target storage device among storage devices which respond to the transmission of the detailed condition.

In an embodiment, the data distribution manager 2500 may control the state information to be shared according to the request and response method or the broadcasting and inquiry method.

The request and response method may be a method that storage devices other than a source storage device transmit state information to the source storage device in response to a transmission request from the source storage device or a method that storage devices, which satisfy a detailed condition for state information transmitted from the source storage device, respond to the source storage device.

The broadcasting and inquiry method may be a method that each of the storage devices 200-1 to 200-n employed in the storage system 1, 10 or 100 transmits its state information to the other storage devices or the BMC 123, and the source storage device refers to the state information.

Figure 4:
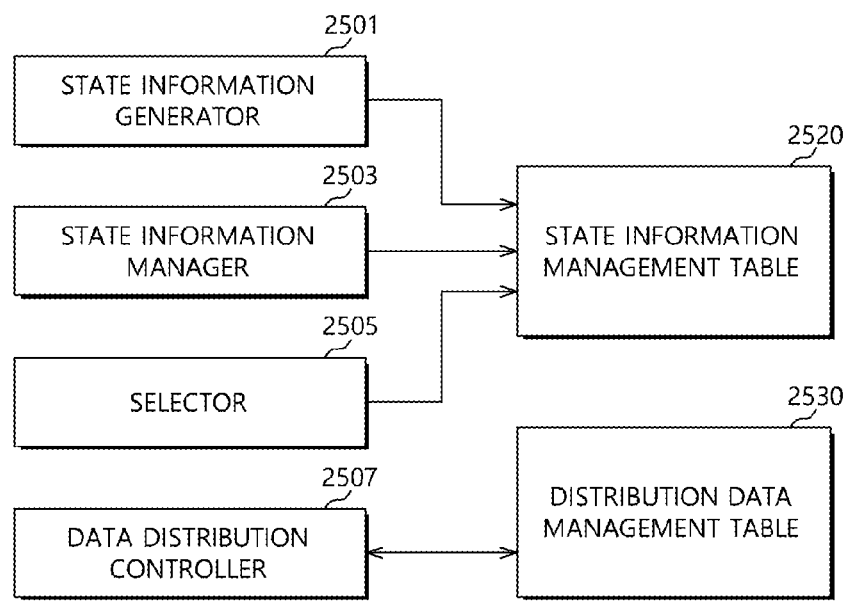
FIG. 4 is a diagram illustrating a configuration of a data distribution manager according to an embodiment of the present disclosure.

FIG. 4 is a diagram illustrating a configuration of a data distribution manager 2500-1 according to an embodiment. The data distribution manager 2500-1 of FIG. 4 may correspond to the data distribution manager 2500 in the storage device 200 shown in FIG. 3. Therefore, the data distribution manager 2500-1 will be described with reference to FIG. 3.

Referring to FIG. 4, the data distribution manager 2500-1 may include a state information generator 2501, a state information manager 2503, a selector 2505, a data distribution controller 2507, a state information management table 2520, and a distribution data management table 2530.

The state information generator 2501 may be configured to collect the state information of the storage device 200, which is set to be shared in the storage systems 10 and 100, through the data storage device 2200 and the processor 2101, and store the collected state information in the state information management table 2520.

The state information may be information collected by the storage device 200 by monitoring a state of the storage device 200, for example, hardware and software states of the storage device 200. The hardware state may include one or more of remaining storage capacity, the number of bad blocks, temperature, lifespan, and the like. For example, the remaining storage capacity and the number of bad blocks may be obtained from the data storage device 2200. The software state may be one or more of a busy degree, the number of requests received from the host 110, a request pattern frequently requested by the host 110, a data pattern requested by the host 110, and the like. The state information generator 2501 may be configured to collect the state information of the storage device 200 again and update the state information stored in the state information management table 2520 when a variation of the state of the storage device 200 being monitored is equal to or more than a threshold value.

The state information manager 2503 may provide the state information of the storage device 200, which is collected by the state information generator 2501 and stored in the state information management table 2520, to the other storage devices employed in the storage system, or receive state information from the other storage devices and store the received state information in the state information management table 2520.

In an embodiment, if there is a state information request from a source storage device that is different from the storage device 200, the state information manager 2503 may be configured to extract the state information of the storage device 200 stored in the state information management table 2520 and transmit the extracted state information to the source storage device in response to the state information request of the source storage device. In an embodiment, as the detailed condition for the state information is transmitted from the source storage device, the state information manager 2503 may confirm whether or not the state information of the storage device 200 satisfies the detailed condition by referring to the state information of the storage device 200 stored in the state information management table 2520, and respond to the source storage device when the state information satisfies the detailed condition.

In an embodiment, as the storage device 200 is employed in the storage system 10 or 100, the state information generator 2501 may collect the state information of the storage device 200, and the state information manager 2503 may broadcast the collected state information to the other storage devices in the storage system 10 or 100.

The selector 2505 may monitor whether or not the distribution of data stored in the storage device 200 is necessary. When the data distribution is necessary, the selector 2505 may be configured to select at least one target storage device by requesting the other storage devices to send state information, transmitting a detailed condition for the state information to the other storage devices, or referring to the state information broadcasted by the other storage devices.

In an embodiment, the selector 2505 may select the at least one target storage device based on the state information received from the other storage devices in response to the state information request, select the at least one target storage device among storage devices which satisfy the detailed condition for the state information, or select the at least one target storage device by referring to the broadcasted state information of the other storage devices.

In an embodiment, the selector 2505 may determine whether or not the data distribution is necessary based on states of the storage device 200 that include a hardware state of the data storage device 2200, such as remaining storage capacity, the number of bad blocks, temperature, lifespan, and the like, and a software state of the storage device 200, but embodiments are not limited thereto. In an embodiment, the selector 2505 may determine whether or not the data distribution is necessary based on the hardware and software states of the storage device 200 that are monitored to collect the state information.

As the at least one target storage device is selected by the selector 2505, the data distribution controller 2507 may select data to be distributed (distribution target data) and transmit the selected distribution target data to the at least one target storage device. The data distribution controller 2507 may store a position of the distribution target data, e.g., a physical address of the at least target storage device to which the distribution target data is distributed, in the distribution data management table 2530.

The distribution target data may be selected based on one or more of various conditions such as a request pattern of the host 110, lifespan of the data storage device 2200 in which the distribution target data is stored, and the like.

Figure 5:
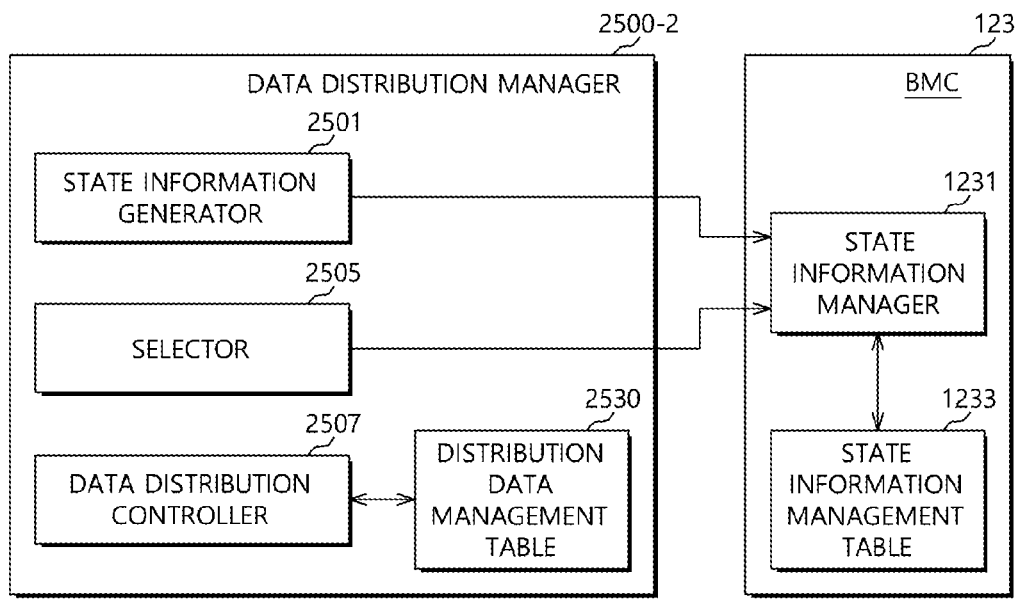
FIG. 5 is a diagram illustrating a configuration of a data distribution manager and a baseboard management controller (BMC) according to an embodiment of the present disclosure.

FIG. 5 is a diagram illustrating a configuration of a data distribution manager 2500-2 and a BMC 123 according to an embodiment. The data distribution manager 2500-2 of FIG. 5 may correspond to the data distribution manager 2500 in the storage device 200 shown in FIG. 3, and the BMC 123 of FIG. 5 may correspond to the BMC 123 shown in FIG. 2A. Therefore, the data distribution manager 2500-2 will be described with reference to FIGS. 2A and 3.

The data distribution manager 2500-2 may include a state information generator 2501, a selector 2505, a data distribution controller 2507, and a distribution data management table 2530.

The BMC 123 may include a state information manager 1231 and a state information management table 1233.

The state information generator 2501 may collect state information set to be shared in the storage systems 10 and 100 through the data storage device 2200 and the processor 2101, and transmit the collected state information to the state information manager 1231 of the BMC 123. The state information manager 1231 may be configured to store the state information received from the storage devices 200-1 to 200-$n$ in the state information management table 1233. In an embodiment, when the storage device 200 is employed in the storage system 10 or 100, the state information generator 2501 may collect the state information of the storage device 200 and transmit the collected state information to the state information manager 1231. When a variation of target state information is equal to or more than a set threshold value, the state information generator 2501 may transmit the changed target state information to the state information manager 1231 to be updated.

The selector 2505 may request the state information manager 1231 to provide it with the state information of the other storage devices or a list of storage devices which satisfy the detailed condition of the state information when the data distribution of the storage device 200 is necessary.

The selector 2505 may be configured to select at least one target storage device to which data is to be distributed as the state information manager 1231 provides the state information of the other storage devices or the list of the storage devices which satisfy the detailed condition of the state information.

In an embodiment, the selector 2505 may determine whether or not the data distribution is necessary based on remaining storage capacity, the number of bad blocks, temperature, lifespan, and the like of the data storage device 2200, but embodiments are not limited thereto.

As the at least one target storage device is selected by the selector 2505, the data distribution controller 2507 may select data to be distributed, i.e., distribution target data, and transmit the distribution target data to the selected target storage device. The data distribution controller 2507 may store a position of the distributed data, e.g., a physical address of the at least target storage device to which the distribution target data is distributed, in the distribution data management table 2530.

The distribution target data may be selected based on various conditions, for example, a request pattern of the host 110, lifespan of the data storage device 2200 in which the distribution target data is stored, and the like.

Figure 6:
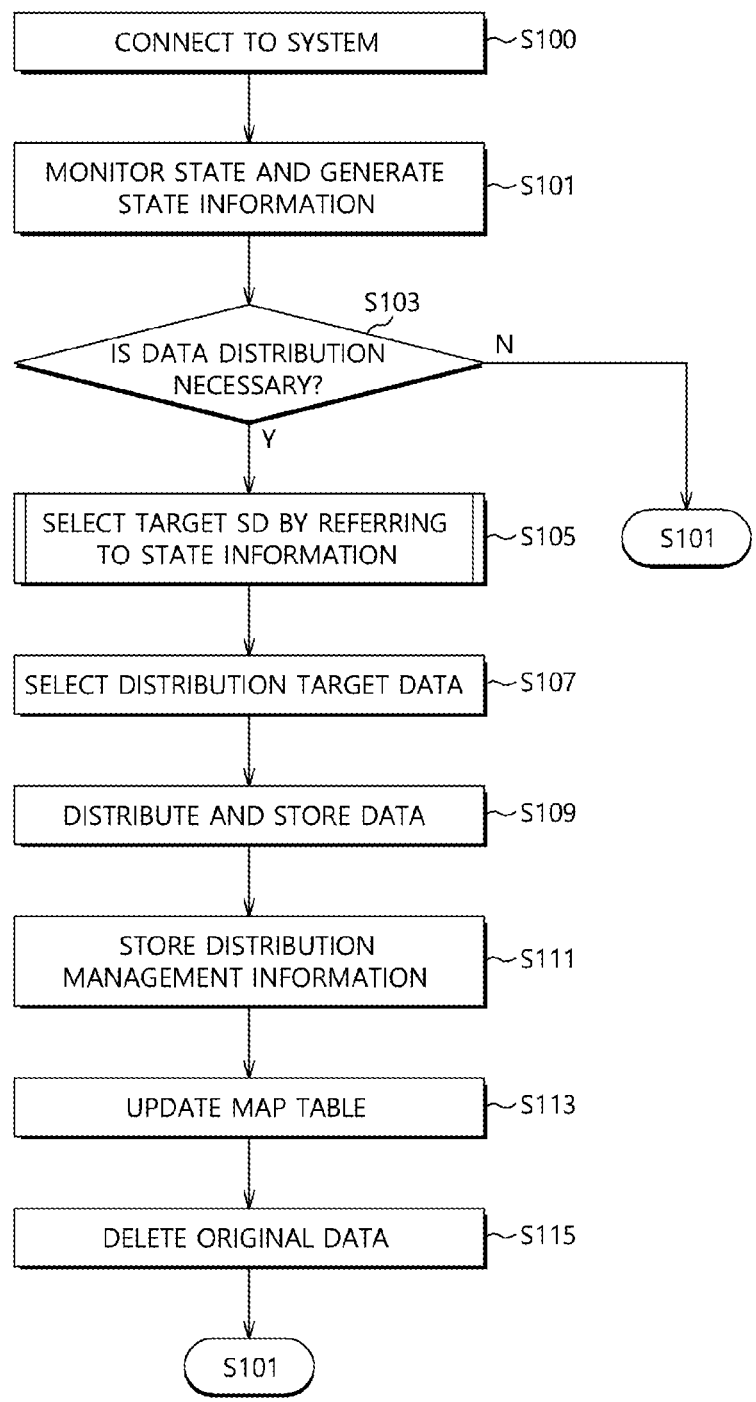
FIG. 6 is a flowchart explaining a data distribution control method of a storage device according to an embodiment of the present disclosure.
Figure 7:
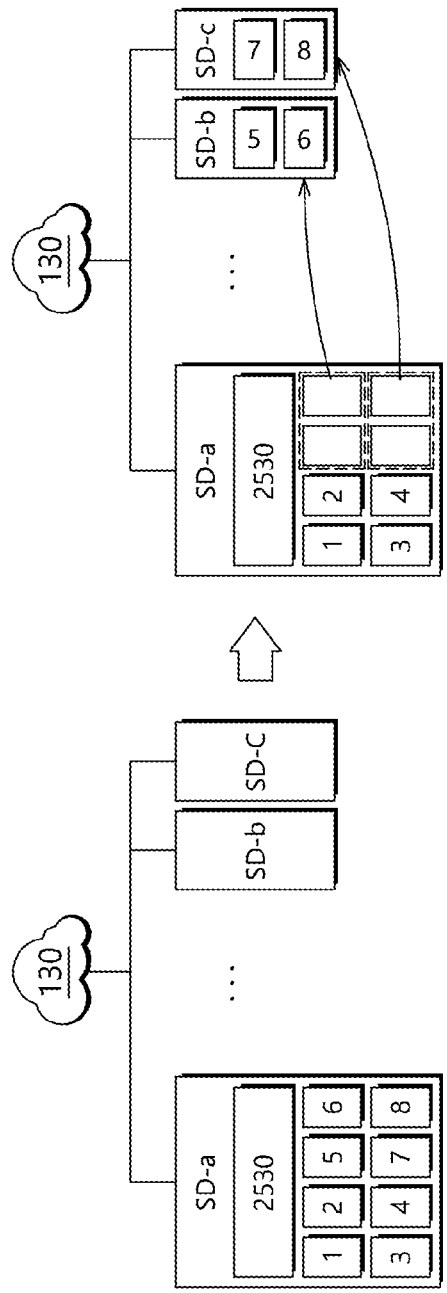
FIG. 7 is a conceptual diagram explaining a data distribution control method of a storage device according to an embodiment of the present disclosure.

FIG. 6 is a flowchart explaining a data distribution control method of a storage device according to an embodiment, and FIG. 7 is a conceptual diagram explaining a data distribution control method of a storage device according to an embodiment. The methods shown in FIGS. 6 and 7 will be described with FIGS. 4 and 5.

Referring to FIGS. 6 and 7, as each of the storage devices 200-1 to 200-n is employed in or connected to the storage system 10 or 100 (S100), the storage device may monitor a hardware stage and a software state of the storage device and generate state information (S101).

The state information may be stored in the state information management table 2520 in each of the storage devices 200-1 to 200-n as shown in FIG. 4 or in the state information management table 1233 of the BMC 123 as shown in FIG. 5.

Each of the storage devices 200-1 to 200-n may determine whether or not data distribution is necessary by monitoring the hardware and software states of the storage device (S103).

When it is determined that the data distribution is not necessary (S103: N), each of the storage devices 200-1 to 200-n may proceed to S101 and monitor the hardware and software states of the storage device continuously. When it is determined that the data distribution is necessary (S103: Y), a storage device, which needs the data distribution, among the storage devices 200-1 to 200-n, may be qualified as a source storage device, e.g., SD-a, and select one or more target storage devices, e.g., SD-b and SD-c, based on the state information of the other storage devices than the corresponding storage device (S105).

In an embodiment, the source storage device SD-a may share the state information with the other storage devices and select the one or more target storage devices SD-b and SD-c in the request and response manner which requests the other storage devices to send the state information or transmits a detailed condition for the state information to the other storage devices. In an embodiment, the source storage device SD-a may be configured to share the state information with the other storage devices and select the one or more target storage devices SD-b and SD-c in the broadcasting and inquiry manner which inquires the state information broadcasted by the other storage devices and stored in the source storage device SD-a or inquiry the state information collected in the BMC 123.

As the one or more target storage devices SD-b and SD-c are selected, the source storage device SD-a may select data to be distributed, i.e., distribution target data, (S107) and transmit the distribution target data to the one or more target storage devices SD-b and SD-c (S109). The data distribution controller 2507 may store, as distribution management information, positions of the distributed data in the distribution data management table 2530 (S111).

As illustrated in FIG. 7, when the distribution target data includes data blocks 5, 6, and 8, the data distribution controller 2507 may distribute and store data blocks 5 and 6 of the distribution target data to and in the first target storage device SD-b, distribute and store data blocks 7 and 8 of the distribution target data to and in the second target storage device SD-c, and store data distribution positions of the data blocks 5, 6, and 8 in the distribution data management table 2530. The data distribution positions of the data blocks 5, 6, 7, and 8 may include physical addresses of the one or more target storage devices to which the data blocks 5, 6, 7, and 8 are distributed.

The source storage device SD-a may update a map table related to the distributed data (S113), delete distributed original data (S115), and return to S101 to continuously monitor the hardware and software states of the source storage device SD-a.

Figure 8:
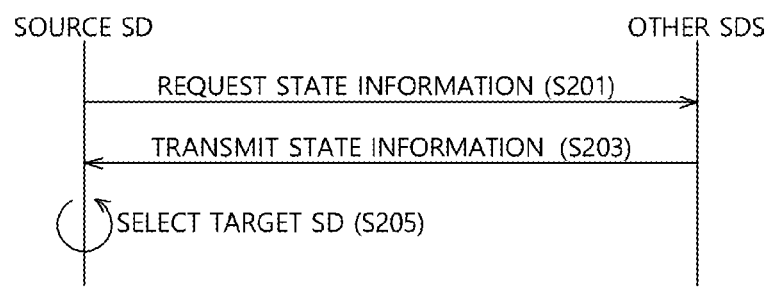
FIGS. 8 and 9 are flowcharts explaining methods of selecting a target storage device according to embodiments of the present disclosure.
Figure 9:
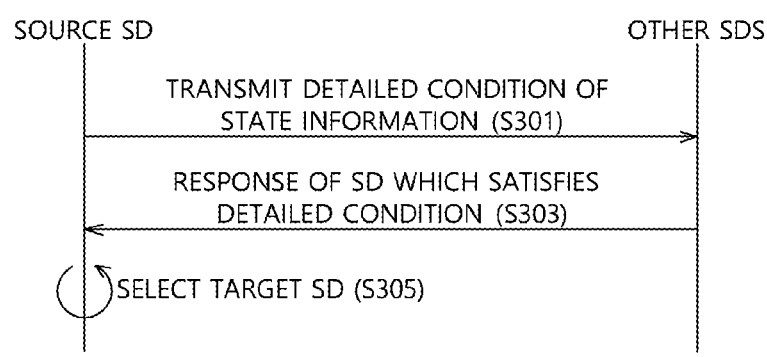

FIGS. 8 and 9 are flowcharts explaining methods of selecting a target storage device according to embodiments.

FIG. 8 illustrates an example of a method of selecting a target storage device through the request and response method.

In a state that each of the storage devices 200-1 to 200-n monitors its hardware/software state to collect state information, a source storage device SD-a which needs data distribution may request the other storage devices to transmit the state information (S201).

In response to the request from the source storage device SD-a, the other storage devices may transmit the state information to the source storage device SD-a (S203) and the source storage device SD-a may select one or more target storage devices SD-b and SD-c suitable for the data distribution based on the received state information of the other storage devices (S205).

FIG. 9 illustrates another example of a method of selecting a target storage device through the request and response method.

In a state that each of the storage devices 200-1 to 200-n monitors its hardware/software state to collect state information, the source storage device SD-a which needs data distribution may transmit a detailed condition for the state information to the other storage devices (S301).

In response to the transmission of the detailed condition, storage devices, which satisfy the detailed condition, among the other storage devices may respond to the source storage device SD-a (S303), and the source storage device SD-a may select the one or more target storage devices SD-b and SD-c among the responded is storage devices (S305).

Figure 10:
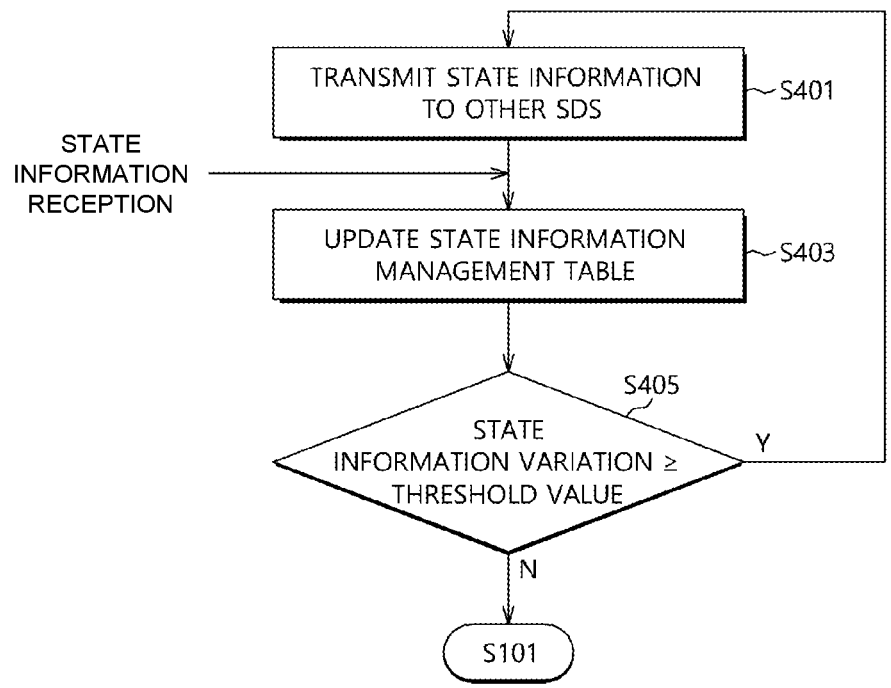
FIGS. 10 and 11 are flowcharts explaining methods of sharing and updating state information according to embodiments of the present disclosure.
Figure 11:
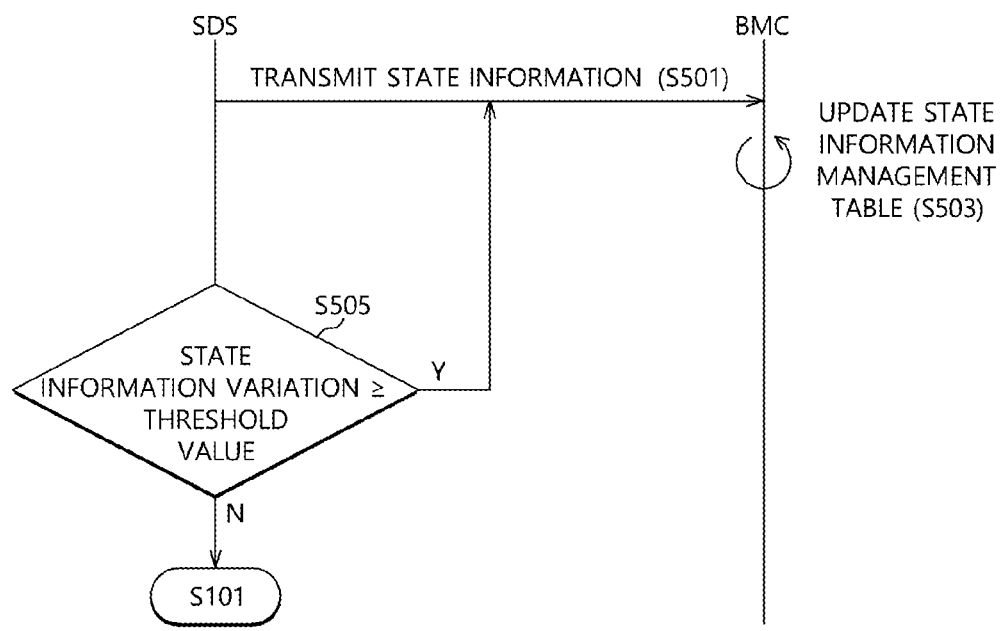

FIGS. 10 and 11 are flowcharts explaining methods of sharing and updating state information according to embodiments. The methods of FIGS. 10 and 11 may correspond to S101 shown in FIG. 6.

FIG. 10 illustrates an example of a method of sharing state information through the broadcasting and inquiry method.

Each of the storage devices 200-1 to 200-n may broadcast state information collected by monitoring its hardware/software state to the other storage devices (S401). Each of the storage devices 200-1 to 200-n may update the state information management table 2520 using the state information broadcasted from the other storage devices (S403).

Each of the storage devices 200-1 to 200-n may determine whether or not a variation of its state information is equal to or more than a set threshold value (S405). When it is determined that the variation of the state information is equal to or more than the threshold value (S405:Y), the process may return to S401 and the storage device may transmit the changed state information to the other storage devices (S401), and the state information management table 2520 of each of the other storage device is updated with the changed state information (S403).

On the other hand, when it is determined that the state information is not changed or the variation of the state information is less than the threshold value (S405:N), the storage device may perform S101 of FIG. 6 to continuously monitor its hardware/software state.

FIG. 11 illustrates another example of a method of sharing state information through the broadcasting and inquiry method.

Each of the storage devices 200-1 to 200-n may monitor its hardware/software state to collect state information and transmit the collected state information to the state information manager 1231 of the BMC 123 (S501). The state information manager 1231 may update the state information management table 1233 using the state information broadcasted from the storage devices 200-1 to 200-n (S503).

Each of the storage devices 200-1 to 200-n may determine whether or not a variation of the state information is equal to or more than a set threshold value (S505). When it is determined that the variation of the state information is equal to or more than the threshold value (S505:Y), the storage device may transmit the changed state information to the state information manager 1231 (S501), and the state information management table 1233 is updated using the changed state information (S503).

On the other hand, when it is determined that the state information is not changed or the variation of the state information is less than the threshold value (S505:N), the storage device may perform S101 of FIG. 6 to continuously monitor its hardware/software.

When the state information is shared as illustrated in FIG. 10 or 11, the source storage device SD-a may refer to the state information management table 2520 or 1233 to select the target storage devices SD-b and SD-c.

Figure 12:
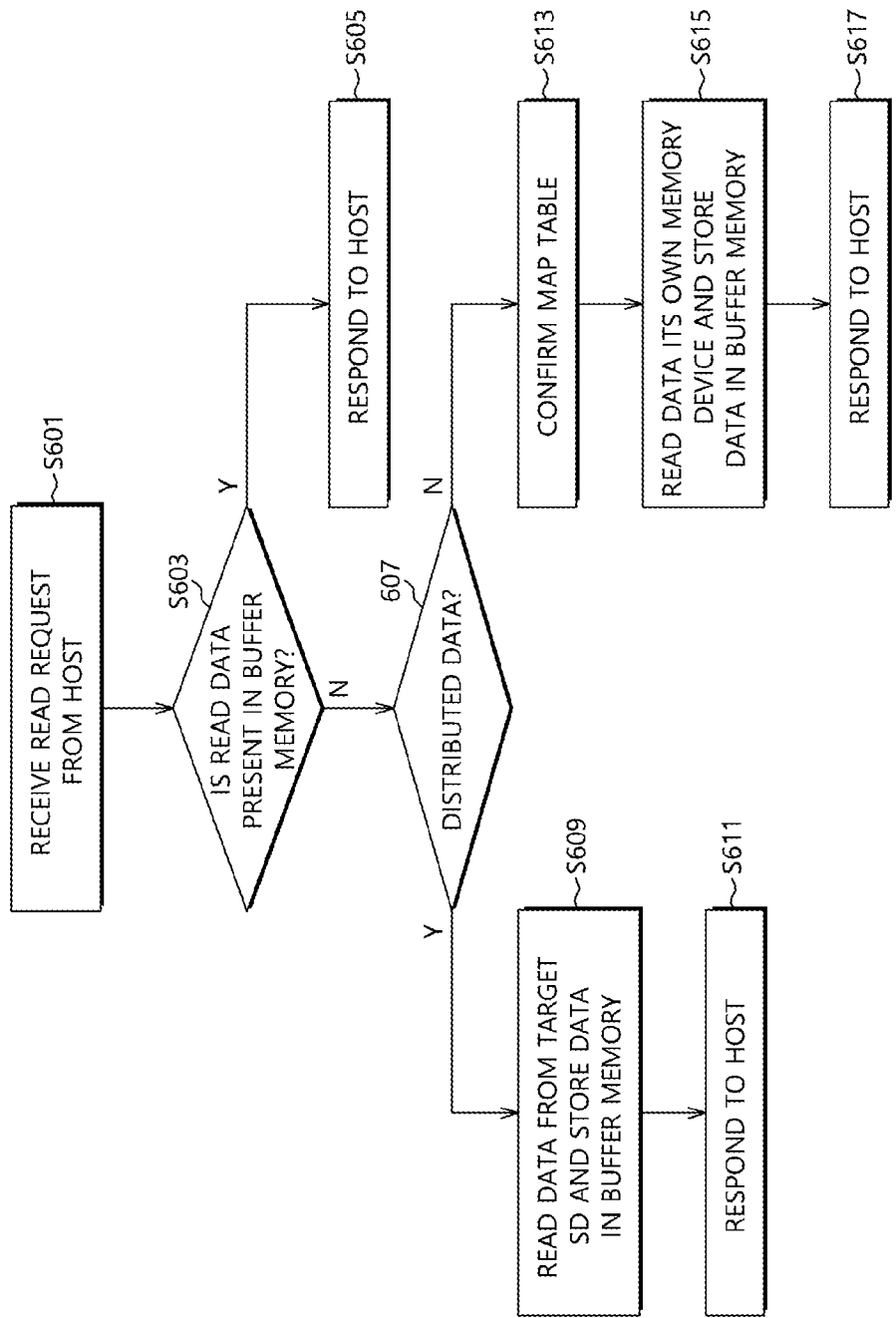
FIG. 12 is a flowchart explaining a data distribution control method of a storage device according to an embodiment of the present disclosure.
Figure 13:
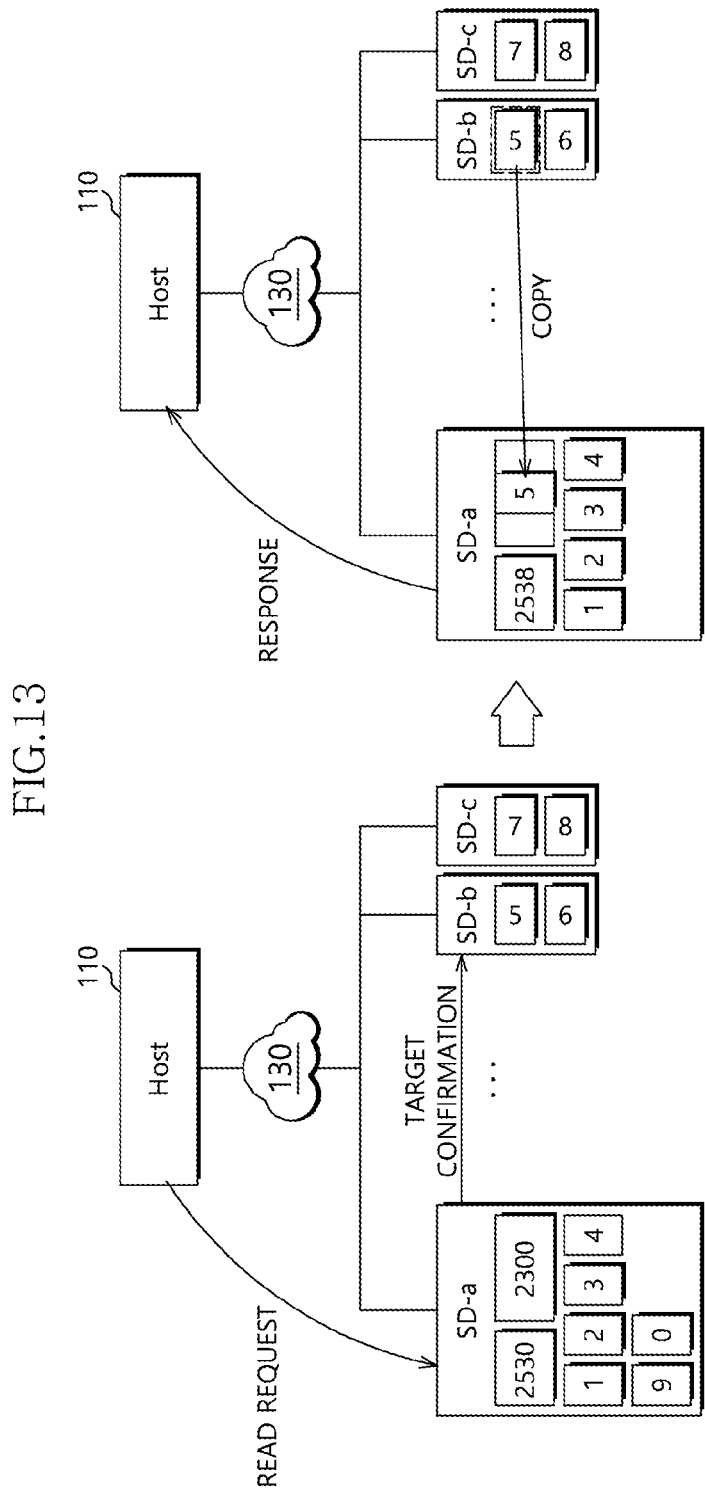
FIG. 13 is a conceptual diagram explaining a data distribution control method of a storage device according to an embodiment of the present disclosure.

FIG. 12 is a flowchart explaining a data distribution control method of a storage device according to an embodiment, and FIG. 13 is a conceptual diagram explaining a data distribution control method of a storage device according to an embodiment.

Referring to FIGS. 12 and 13, as the host 110 transmits a request for reading data (e.g., data block 5) to a specific storage device SD-a in the storage system 10 or 100 (S601), the storage device SD-a which receives the read request may determine whether or not read-requested data (e.g., data block 5) is present in the buffer memory 2300 of the storage device SD-a (S603).

When it is determined that the read-requested data (e.g., data block 5) is present in the buffer memory 2300 (S603:Y), the storage device SD-a may provide the read-requested data (e.g., data block 5) to the host 110 (S605).

On the other hand, when it is determined that the read-requested data (e.g., data block 5) is not present in the buffer memory 2300 (S603:N), the storage device SD-a may determine whether or not the read-requested data (e.g., data block 5) is data distributed to the target storage devices 200-b and 200-c by referring to the distribution data management table 2530 or 1233 (S607).

When it is determined that the read-requested data (e.g., data block 5) is the distributed data (S607:Y), as illustrated in FIG. 13, the storage device SD-a may confirm the target storage device SD-b storing the read-requested data (e.g., data block 5) by referring to the distribution data management table 2530 or 1233, access the target storage device SD-b to read the read-requested data (e.g., data block 5), and store the read data (e.g., data block 5) in the buffer memory 2300 (S609). The storage device SD-a may provide the data (e.g., data block 5) stored in the buffer memory 2300 to the host 110 (S611).

On the other hand, when it is determined that the read-requested data (e.g., data block 5) is not the distributed data (S607:N), the storage device SD-a may confirm a storage position of the read-requested data (e.g., data block 5) in a memory device of the storage device SD-a by referring to a map table (S613), read the read-requested data (e.g., data block 5) from the memory device, and store the read data (e.g., data block 5) in the buffer memory 2300 (S615). The storage device SD-a may provide the data (e.g., data block 5) stored in the buffer memory 2300 to the host 110 (S617).

Figure 14:
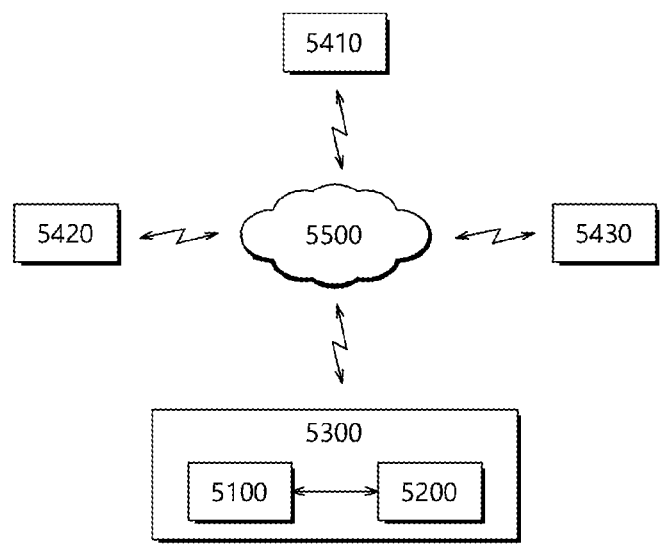
FIG. 14 is a diagram illustrating a network system including a data storage device in accordance with an embodiment.

FIG. 14 is a diagram illustrating a network system 5000 including a data storage device in accordance with an embodiment. Referring to FIG. 14, the network system 5000 may include a server system 5300 and a plurality of client systems 5410, 5420, and 5430, which are coupled through a network 5500.

The server system 5300 may serve data in response to requests from the plurality of client systems 5410 to 5430. For example, the server system 5300 may store data provided by the plurality of client systems 5410 to 5430. For another example, the server system 5300 may provide data to the plurality of client systems 5410 to 5430.

The server system 5300 may include a host device 5100 and a memory system 5200. The server system 5300 may be configured as the storage system 1 shown in FIG. 1, the storage system 10 shown in FIG. 2A, or the storage system 100 shown in FIG. 2B.

The above described embodiments of the present disclosure are intended to illustrate and not to limit the present invention. Various alternatives and equivalents thereof are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. A storage system comprising:
at least one host; and
a plurality of storage devices coupled to the at least one host through a network,
wherein each of the plurality of storage devices generates state information of the respective storage device by monitoring hardware and software states of the storage device, and
wherein, from among the plurality of storage devices, a source storage device selects at least one target storage device based on the state information of the plurality of storage devices other than the source storage device, and transmits distribution target data of the source storage device to the at least one target storage device, the source storage device being a storage device which needs data distribution.

2. The storage system of claim 1, wherein the source storage device requests the other storage devices to send the state information of the other storage devices to the source storage device and selects the at least one target storage device based on the state information from the other storage devices.

3. The storage system of claim 1, wherein the source storage device transmits a detailed condition for the state information to the other storage devices and selects the at least one target storage device based on a response of a storage device of the plurality of storage devices which satisfies the detailed condition.

4. The storage system of claim 1, wherein as each of the plurality of storage devices is connected to the network, each of the plurality of storage devices transmits its state information to the other storage devices, and stores the state information of the plurality of storage devices therein, and wherein the source storage device selects the at least one target storage device based on the state information of the other storage devices.

5. The storage system of claim 1, further comprising a baseboard management controller to manage the plurality of storage devices,
wherein each of the plurality of storage devices transmits its state information to the baseboard management controller, and
wherein the source storage device selects the at least one target storage device based on the state information of the other storage devices stored in the baseboard management controller.

6. The storage system of claim 1, wherein the source storage device divides the distribution target data into a plurality of pieces of data and transmits the plurality of pieces of data to a plurality of target storage devices, respectively.

7. The storage system of claim 1, wherein the hardware state includes one or more of remaining storage capacity, a number of bad blocks, temperature, and lifespan of the storage device, and the software state includes one or more of a busy degree, a number of requests provided by the host, a request pattern frequently requested by the host, and a data pattern requested by the host.

8. A storage device which is coupled to at least one host through a network, the storage device comprising:
a controller; and
a data storage device to store and read data according to control of the controller,
wherein the controller includes:
a network interface to couple the storage device to the network;
a storage interface to provide a communication channel between the controller and the data storage device; and
a processor to generate and store first state information of the storage device by monitoring hardware and software states of the storage device, set the storage device as a source storage device when data distribution is necessary according to a monitoring result, select at least one target storage device based on second state information of a plurality of storage devices connected to the network, and transmit distribution target data of the source storage device to the at least one target storage device, the plurality of storage devices being different from the storage device.

9. The storage device of claim 8, wherein when the data distribution is necessary, the processor requests the plurality of storage devices to send the second state information and selects the at least one target storage device based on the second state information.

10. The storage device of claim 8, wherein when the data distribution is necessary, the processor transmits a detailed condition for the second state information to the plurality of storage devices and selects the at least one target storage device according to a response of a storage device of the plurality of storage devices which satisfies the detailed condition.

11. The storage device of claim 8, wherein as the storage device is connected to the network, the storage device broadcasts the first state information to the plurality of storage devices and receives and stores the second state information broadcasted from the plurality of storage devices therein, and
the processor selects the at least one target storage device based on the second state information of the plurality of storage devices when the data distribution is necessary.

12. The storage device of claim 8, wherein the storage device is connected to a baseboard management controller and transmits the first state information to the baseboard management controller, and
the processor selects the at least one target storage device based on the second state information of the plurality of storage devices stored in the baseboard management controller when the data distribution is necessary.

13. The storage device of claim 8, wherein the hardware state includes one or more of remaining storage capacity, a number of bad blocks, temperature, and lifespan of the storage device and the software state includes one or more of a busy degree, a number of requests provided by the host, a request pattern frequently requested by the host, and a data pattern requested by the host.

14. An operating method of a storage system, the method comprising:
generating and storing, by each of a plurality of storage devices, state information by monitoring hardware and software states of each of the respective plurality of storage devices, the plurality of storage devices being coupled to at least one host through a network;
selecting, by a source storage device, at least one target storage device based on the state information of storage devices other than the source storage device from among the plurality of storage devices, the source storage device being a storage device which needs data distribution according to a monitoring result of the state information; and
transmitting, by the source storage device, distribution target data to the at least one target storage device.

15. The method of claim 14, wherein the selecting of the at least one target storage device includes:
requesting the other storage devices to send the state information of the other storage devices to the source storage device; and
selecting the at least one target storage device based on the state information of the other storage devices.

16. The method of claim 14, wherein the selecting of the at least one target storage device includes:
transmitting a detailed condition for the state information to the other storage devices; and
selecting the at least one target storage device according to a response of a storage device of the plurality of storage devices which satisfies the detailed condition.

17. The method of claim 14, wherein the selecting of the at least one target storage device includes:
as each of the plurality of storage devices is connected to the network, broadcasting the state information of the source storage device to the other storage devices;
receiving and storing the state information broadcasted from the other storage devices; and
selecting the at least one target storage device based on the state information of the other storage devices.

18. The method of claim 14, wherein the storage system further includes a baseboard management controller for managing the plurality of storage devices, and
wherein the method further comprises transmitting, by each of the plurality of storage devices, the state information to the baseboard management controller, and
wherein the selecting of the at least one target storage device includes selecting the at least one target storage device based on the state information of the other storage devices stored in the baseboard management controller.

19. The method of claim 14, wherein the hardware state includes one or more of remaining storage capacity, a number of bad blocks, temperature, and lifespan of the storage device and the software state includes one or more of a busy degree, a number of requests provided by the host, a request pattern frequently requested by the host, and a data pattern requested by the host.

20. The method of claim 14, further comprising:
receiving, by the source storage device, a read request from the host,
determining whether or not read-requested data is the distribution target data; and
reading the read-requested data from the at least one target storage device according to a determination result that the read-requested data is the distribution target data; and
providing read data to the host.

* * * * *